(12) United States Patent
Takano

(10) Patent No.: US 11,794,739 B2
(45) Date of Patent: Oct. 24, 2023

(54) VEHICLE DRIVING ASSISTANCE APPARATUS DURING VEHICLE CUT IN OPERATIONS

(71) Applicant: SUBARU CORPORATION, Tokyo (JP)

(72) Inventor: Masaru Takano, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 191 days.

(21) Appl. No.: 17/343,036

(22) Filed: Jun. 9, 2021

(65) Prior Publication Data

US 2021/0387621 A1 Dec. 16, 2021

(30) Foreign Application Priority Data

Jun. 11, 2020 (JP) .................................. 2020-101496

(51) Int. Cl.
*B60W 30/16* (2020.01)
*B60W 30/165* (2020.01)

(52) U.S. Cl.
CPC ........ *B60W 30/162* (2013.01); *B60W 30/165* (2013.01); *B60W 2554/4041* (2020.02); *B60W 2554/4042* (2020.02); *B60W 2554/802* (2020.02)

(58) Field of Classification Search
CPC ............. B60W 30/162; B60W 30/165; B60W 2554/4041; B60W 2554/4042; B60W 2554/802
USPC .......................................................... 701/96
See application file for complete search history.

(56) References Cited

U.S. PATENT DOCUMENTS

| | | | |
|---|---|---|---|
| 6,259,395 B1* | 7/2001 | Adachi | G08G 1/161 701/96 |
| 7,898,433 B2* | 3/2011 | Roberts | G08G 1/0104 340/933 |
| 9,296,263 B2* | 3/2016 | Muthukumar | B60T 1/10 |
| 11,572,062 B2* | 2/2023 | Inoue | B60T 7/12 |
| 2012/0277967 A1* | 11/2012 | Isaji | B60W 50/0098 701/96 |
| 2018/0093606 A1* | 4/2018 | Terwilliger | G08G 1/0965 |

(Continued)

FOREIGN PATENT DOCUMENTS

JP        2019-38363 A    3/2019

*Primary Examiner* — Richard A Goldman
(74) *Attorney, Agent, or Firm* — TROUTMAN PEPPER HAMILTON SANDERS LLP

(57) ABSTRACT

A driving assistance apparatus for a vehicle includes a surrounding environment information acquirer that acquires environment information about a surrounding of the vehicle, a leading-vehicle detector that detects a leading vehicle based on the environment information, a moving-body detector that detects a moving body in the surrounding of the vehicle based on the environment information, a vehicle-speed detector that detects a vehicle speed of the vehicle, and a region setter that sets a cut-in detection region for detecting entrance of the moving body between the vehicle and the leading vehicle when a travel controller causes the vehicle to travel such that the vehicle follows the leading vehicle. The region setter sets a protruding region that is included in the cut-in detection region based on at least the vehicle speed such that a length of protrusion in a left-right direction of the protruding region increases as the vehicle speed decreases.

11 Claims, 12 Drawing Sheets

(56) References Cited

U.S. PATENT DOCUMENTS

| | | | |
|---|---|---|---|
| 2019/0014446 A1* | 1/2019 | Gade | G08G 1/0133 |
| 2019/0035284 A1* | 1/2019 | Tam | G05D 1/0293 |
| 2019/0204823 A1* | 7/2019 | Meier | G05D 1/0011 |
| 2019/0225142 A1* | 7/2019 | Switkes | G08G 1/22 |
| 2019/0256086 A1* | 8/2019 | Ohmura | B60T 7/12 |
| 2019/0384322 A1* | 12/2019 | Luckevich | B60W 30/14 |
| 2020/0013292 A1* | 1/2020 | Switkes | G08G 1/166 |
| 2020/0307582 A1* | 10/2020 | Sato | B60W 60/0053 |
| 2020/0388157 A1* | 12/2020 | Fukushige | G08G 1/167 |
| 2020/0406901 A1* | 12/2020 | Kang | B60W 40/09 |
| 2021/0284142 A1* | 9/2021 | Mine | G08G 1/167 |
| 2021/0295703 A1* | 9/2021 | Jalali | G08G 1/096741 |
| 2021/0347372 A1* | 11/2021 | Bagschik | G06F 17/18 |
| 2021/0387621 A1* | 12/2021 | Takano | B60W 30/162 |
| 2022/0017110 A1* | 1/2022 | Smith | B65G 63/004 |
| 2022/0144277 A1* | 5/2022 | Hiramatsu | B60W 30/18163 |
| 2022/0292986 A1* | 9/2022 | Brandin | G08G 1/22 |
| 2022/0348139 A1* | 11/2022 | Roeber | B60Q 1/525 |

* cited by examiner

VEHICLE DRIVING ASSISTANCE APPARATUS DURING VEHICLE CUT IN OPERATIONS

CROSS-REFERENCE TO RELATED APPLICATION

The present application claims priority from Japanese Patent Application No. 2020-101496 filed on Jun. 11, 2020, the entire contents of which are hereby incorporated by reference.

BACKGROUND

The disclosure relates to a vehicle driving assistance apparatus that sets a cut-in detection region for detecting a cut-in moving body between a vehicle and a leading vehicle to be followed by the vehicle while the vehicle travels at a low speed or stops.

Hitherto, adaptive cruise control (ACC) is known as a driving assistance control. In ACC, a set vehicle speed is maintained under constant speed travel control when there is no leading vehicle to be followed by a vehicle equipped with ACC, and the vehicle is caused to follow the leading vehicle with a predetermined distance from the leading vehicle maintained when the leading vehicle to be followed is detected.

In recent years, a system in which the application range of ACC has been increased to a low speed range (from 0 [Km/h]) to provide a traffic jam following function is also known. In ACC including the traffic jam following function enables a vehicle equipped with ACC to automatically stop or start so as to follow a leading vehicle that stops or starts in addition to following travel control described above.

When the leading vehicle stops, ACC including the traffic jam following function decreases the speed of the vehicle such that the vehicle follows the leading vehicle and causes the vehicle to stop with a target distance between the vehicles left. Subsequently, the vehicle starts so as to follow the leading vehicle when a predetermined delay time has passed after the leading vehicle starts. In the case where the distance between the vehicle and the leading vehicle is relatively long when the vehicle stops, there is a high possibility that another vehicle that travels in a lane (an adjacent lane) adjacent to the lane (the current lane) in which the vehicle travels cuts in between the vehicle and the leading vehicle.

In the case where the cut-in vehicle cannot be recognized when the ACC system causes the vehicle to start such that the vehicle follows the leading vehicle, avoidance control (for example, increasing the delay time at the start) against the cut-in vehicle is not implemented, but ACC continues the following travel control against the leading vehicle.

For example, during following start control after the vehicle follows the leading vehicle and stops as disclosed in Japanese Unexamined Patent Application Publication No. 2019-38363 (JP-A), a monitoring region is set to a predetermined range including a range from the rear end of the leading vehicle to the vehicle when the vehicle stops, and another vehicle that enters the monitoring region is monitored. In the case where the other vehicle that enters the monitoring region is detected, the start delay time when the vehicle starts so as to follow the leading vehicle, or an acceleration time during which the speed of the vehicle reaches a vehicle speed for following the leading vehicle is set such that a time during which the other vehicle that tries to enter the monitoring region is in front of the vehicle is longer than a time during which the other vehicle is behind the vehicle. In this way, driver's anxiety when the vehicle starts so as to follow the leading vehicle is tried to be alleviated.

SUMMARY

An aspect of the disclosure provides a vehicle driving assistance apparatus to be applied to a vehicle. The vehicle driving assistance apparatus includes a surrounding environment information acquirer, a leading-vehicle detector, a moving-body detector, a travel controller, a vehicle-speed detector, and a region setter. The surrounding environment information acquirer is configured to acquire environment information about a surrounding of the vehicle. The leading-vehicle detector is configured to detect a leading vehicle to be followed by the vehicle, on a basis of the environment information that is acquired by the surrounding environment information acquirer. The moving-body detector is configured to detect a moving body in the surrounding of the vehicle, on a basis of the environment information acquired by the surrounding environment information acquirer. In a case where the leading-vehicle detector detects the leading vehicle to be followed by the vehicle, the travel controller is configured to cause the vehicle to perform following travel in which the vehicle follows the leading vehicle. The vehicle-speed detector is configured to detect a vehicle speed of the vehicle. The region setter is configured to set a cut-in detection region for detecting entrance of the moving body between the vehicle and the leading vehicle when the travel controller causes the vehicle to perform the following travel. The region setter is configured to set a protruding region in the cut-in detection region in accordance with at least the vehicle speed detected by the vehicle-speed detector in such a manner that a length of protrusion in a left-right direction of the protruding region increases as the vehicle speed decreases.

An aspect of the disclosure provides a vehicle driving assistance apparatus to be applied to a vehicle. The vehicle driving assistance apparatus includes one or more sensors and circuitry. The one or more sensors are configured to acquire environment information about a surrounding of a vehicle, and to detect a vehicle speed of the vehicle. The circuitry is configured to detect a leading vehicle to be followed by the vehicle, on a basis of the environment information. The circuitry is configured to detect a moving body near the vehicle, on a basis of the environment information. In a case where the leading vehicle to be followed by the vehicle is detected, the circuitry is configured to cause the vehicle to perform following travel in which the vehicle follows the leading vehicle. The circuitry is configured to set a cut-in detection region for detecting entrance of the moving body between the vehicle and the leading vehicle when the vehicle is caused to perform the following travel. The circuitry is configured to set a protruding region in the cut-in detection region at least in accordance with the vehicle speed detected by the vehicle-speed detector in such a manner that a length of protrusion in a left-right direction of the protruding region increases as the vehicle speed decreases.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 1 schematically illustrates the structure of a driving assistance apparatus.

DETAILED DESCRIPTION

As for the monitoring region disclosed in JP-A No. 2019-38363 described above, even when the ACC system recognizes the cut-in vehicle during following travel where the vehicle travels at a very low speed so as to follow the leading vehicle, it is difficult to appropriately respond, because the control is performed at the start of the vehicle after the vehicle stops so as to follow the leading vehicle.

In addition, the monitoring region disclosed in JP-A No. 2019-38363 has a rectangular shape along the current lane. The monitoring region is set based on the current lane. Accordingly, in the case where lane lines that define the left and right of the current lane are unclear, the monitoring region cannot be set.

If the cut-in vehicle described above or an overtaking vehicle can be detected early, the ACC enables the avoidance control to be implemented in good time. However, in the case where the monitoring region described above is expanded in the vehicle width direction of the vehicle more than necessary, a vehicle that travels in an adjacent lane, for example, is likely to be mistakenly determined to be a cut-in vehicle, and the precision of detection of the cut-in vehicle disadvantageously decreases.

It is desirable to provide a vehicle driving assistance apparatus that makes such detection possible and can successfully implement avoidance control not only in the case where the start of a leading vehicle is detected and the vehicle tries to start so as to follow the leading vehicle, but also during the following travel at a very low speed or during the following travel with the lane lines that define the left and right of the current lane being unclear.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 2:
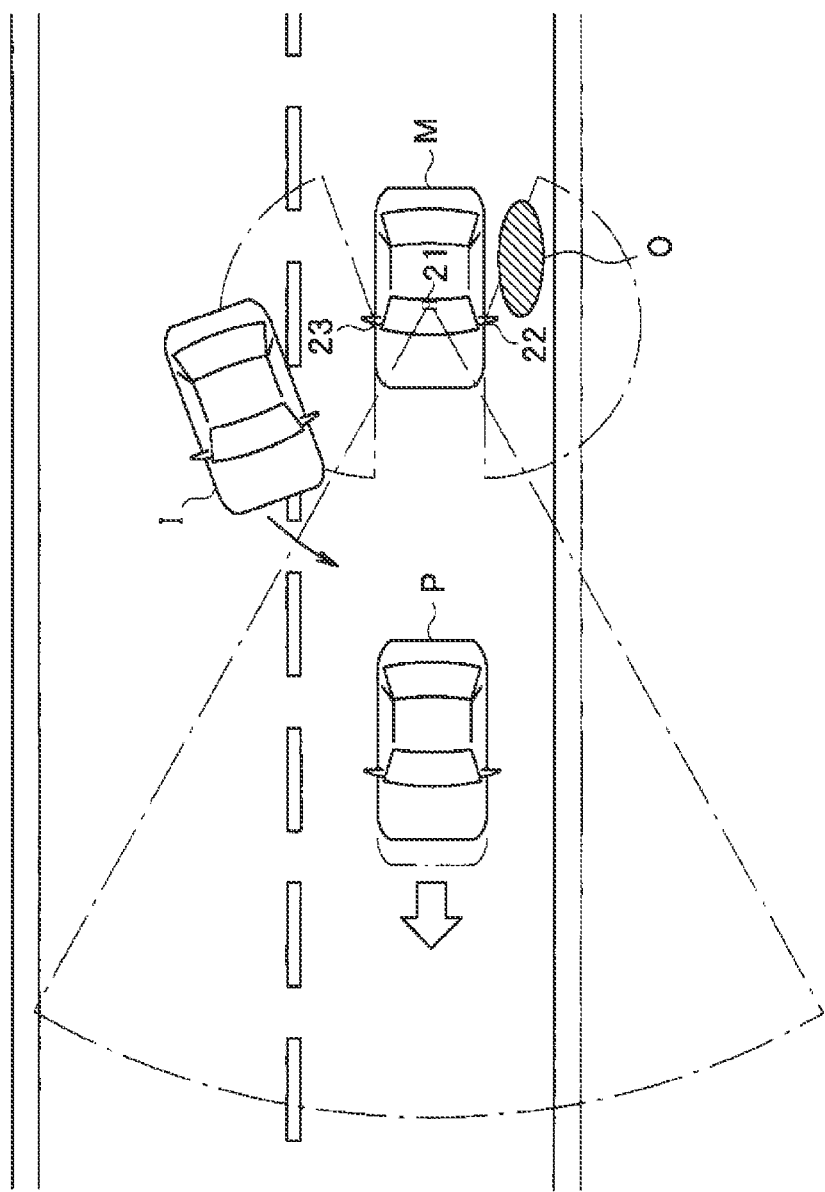
FIG. 2 illustrates a cut-in vehicle or an overtaking vehicle.

In FIG. 2, a vehicle M is a vehicle to which the embodiment is applied and travels in a travel lane. A leading vehicle P is a vehicle that travels in immediate front of the vehicle M and that is followed by the vehicle M. A cut-in vehicle M is a vehicle that tries to cut in between the leading vehicle P and the vehicle M. A moving body P is, for example, a bicycle or a motorcycle that tries to overtake the vehicle M. Note that the cut-in vehicle I is included in moving bodies near the vehicle M. In the description according to the present embodiment, the vehicle M travels in the left-hand lane as a premise. Accordingly, in the case where the vehicle M travels in the right-hand lane, the left is read as the right for application.

Figure 1:
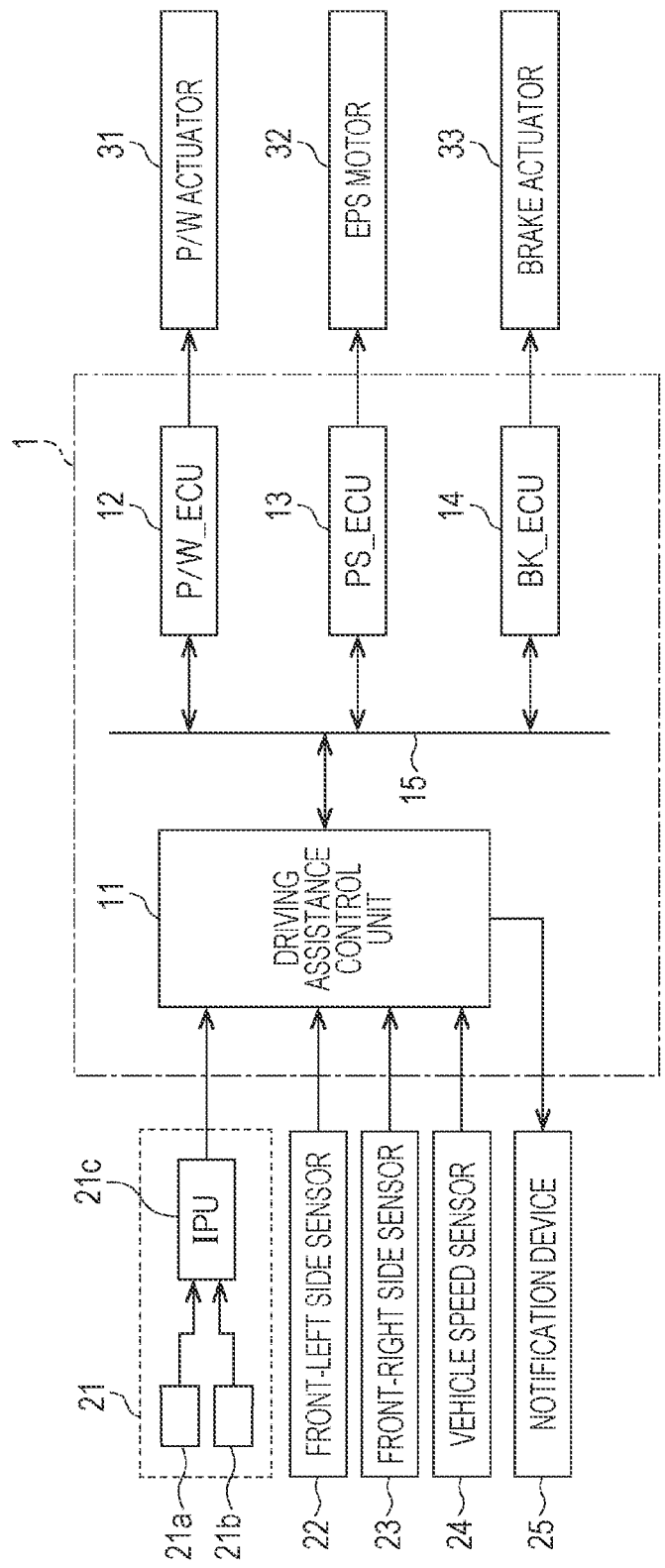

The vehicle M includes a driving assistance apparatus 1 illustrated in FIG. 1. The driving assistance apparatus 1 includes control units such as a driving assistance control unit 11, a power control unit (P/W_ECU) 12, a power steering control unit (PS_ECU) 13, and a brake control unit (BK_ECU) 14. The control units 11 to 14 are coupled to each other via an in-vehicle communication line 15 such as a controller area network (CAN) so as to be capable of establishing bidirectional communication. Each of the control units 11 to 14 includes a microcomputer that includes, for example, a CPU, a ROM, a RAM, and a non-volatile storage unit. A control program and fixed data for operation that is set for every system, for example, are stored in the ROM.

A vehicle-mounted camera unit 21, a front-left side sensor 22, a front-right side sensor 23, and a vehicle speed sensor 24 that detects the vehicle speed VM of the vehicle M are coupled to the input of the driving assistance control unit 11, and a notification device 25 is coupled to the output of the driving assistance control unit 11. In one embodiment, the vehicle speed sensor 24 may serve as a "vehicle-speed detector", and one or more image sensors included in the vehicle-mounted camera unit 21, the front-left side sensor 22, and the front-right side sensor 23 may serve as a "surrounding environment information acquirer".

The vehicle-mounted camera unit 21 includes a stereo camera that includes a main camera 21a and a sub camera 21b, and an image-processing unit (IPU) 21c. Images of environment information about environment in front of the vehicle M that are acquired by both of the cameras 21a and 21b are processed by the IPU 21c in a predetermined method and are transmitted as front environment information to the driving assistance control unit 11.

The front-left side sensor 22 and the front-right side sensor 23 are disposed near door mirrors and acquire environment information about the front left, the front right, and the sides in relatively wide ranges that are outside of the field of vision of the vehicle-mounted camera unit 21 described above. Examples of the front-left side sensor 22 and the front-right side sensor 23 include a distance sensor such as a millimeter wave radar, a microwave radar, an ultrasonic sensor, a light detection and ranging (LiDAR) sensor, and a side camera. The distance sensor and the side camera may be combined and included in each of the front-left side sensor 22 and the front-right side sensor 23.

The front-left side sensor 22 and the front-right side sensor 23 monitor regions of the left side, the right side, and the front left and right that are difficult to recognize by using the images from the vehicle-mounted camera unit 21 described above. The acquired information is transmitted as front side environment information to the driving assistance control unit 11. The front side environment information and the front environment information described above correspond to environment information about a surrounding according to the embodiment of the disclosure.

The driving assistance control unit 11 is equipped with adaptive cruise control (ACC) corresponding to driving assistance control in the front-rear direction, active lane keep (ALK) control, and lane departure prevention (LDP) control corresponding to driving assistance control in the left-right direction.

In the ACC, whether the leading vehicle P to be followed by the vehicle M is present is monitored based on the driving assistance control unit 11. In the case where the leading vehicle P is recognized, following travel control is implemented with the predetermined distance from the leading vehicle P maintained. In the case where the leading vehicle P is not detected, the vehicle M travels at a set constant vehicle speed. At this time, the ALK control is implemented such that the vehicle M travels at the center of the travel lane. In the case where it is determined that the vehicle M tends to cross the lane lines that define the left and right of the travel lane, the LDP control prevents the vehicle M from crossing the lane lines.

The driving assistance control unit 11 imaginarily sets a monitoring region R (see FIG. 9 to FIG. 18) on the road between the leading vehicle P and the vehicle M when implementing the following travel control such that the vehicle M follows the leading vehicle P at a low speed, or implementing following start control after the vehicle M stops. The monitoring region R is set based on the front environment information from the vehicle-mounted camera unit 21 and the front side environment information from the front-left side sensor 22 and the front-right side sensor 23.

The driving assistance control unit 11 monitors the cut-in vehicle I that enters the monitoring region R and a moving body O on a road edge such as a bicycle, a motorcycle, or a pedestrian that overtakes the vehicle M and that enters the monitoring region R (see FIG. 2). In the case where the cut-in vehicle I or the moving body O on the road edge that enters the monitoring region R is detected, the driving assistance control unit 11 causes the vehicle M to take avoidance action. According to the present embodiment, the avoidance action is taken by releasing the ACC.

When the driving assistance control unit 11 detects the cut-in vehicle I or the moving body O on the road edge that enters the monitoring region R, or when the ACC is released, the notification device 25 notifies a driver of the detection or releasing and calls attention. The notification device 25 includes, for example, a monitor and a speaker and notifies the driver by using characters, an image, or a voice.

The P/W_ECU 12 controls the output of a driving source depending on, for example, a travel load. The driving source is a hybrid driving source that includes an engine and an electric motor, or a driving source that has a single body such as an engine or an electric motor. The P/W_ECU 12 is coupled to a P/W actuator 31 that controls the output of the driving source. In the case where the driving source includes an electric motor, the P/W actuator 31 implements both of power running control and regenerative control in response to an instruction from the P/W_ECU 12.

A brake actuator 33 is coupled to the output of the BK_ECU 14. The brake actuator 33 adjusts brake hydraulic pressure that is applied to a brake wheel cylinder that is disposed on each wheel. When the brake actuator 33 is driven by a driving signal from the BK_ECU 14, the brake wheel cylinder applies braking force to each of wheels, and the speed is forcibly decreased.

When the driving assistance control unit 11 implements the ACC, a target vehicle speed at which the vehicle M follows the leading vehicle P is set. In the case where the leading vehicle P to be followed by the vehicle M is not recognized, the target vehicle speed is set to the set vehicle speed, and a signal corresponding to the target vehicle speed is transmitted to the P/W_ECU 12. At this time, in the case where the speed is not sufficiently decreased by the driving source, a control signal is transmitted to the BK_ECU 14, and the speed is decreased to a predetermined speed by forcibly braking.

An electric power steering (EPS) motor 32 is coupled to the output of the PS_ECU 13. The EPS motor 32 applies steering torque to a steering mechanism by using the rotational force of the motor. When the driving assistance control unit 11 implements the ALK control and the LDP control, a control signal is transmitted to the PS_ECU 13, and steering control is implemented such that the vehicle M travels along the travel lane.

Figure 4:
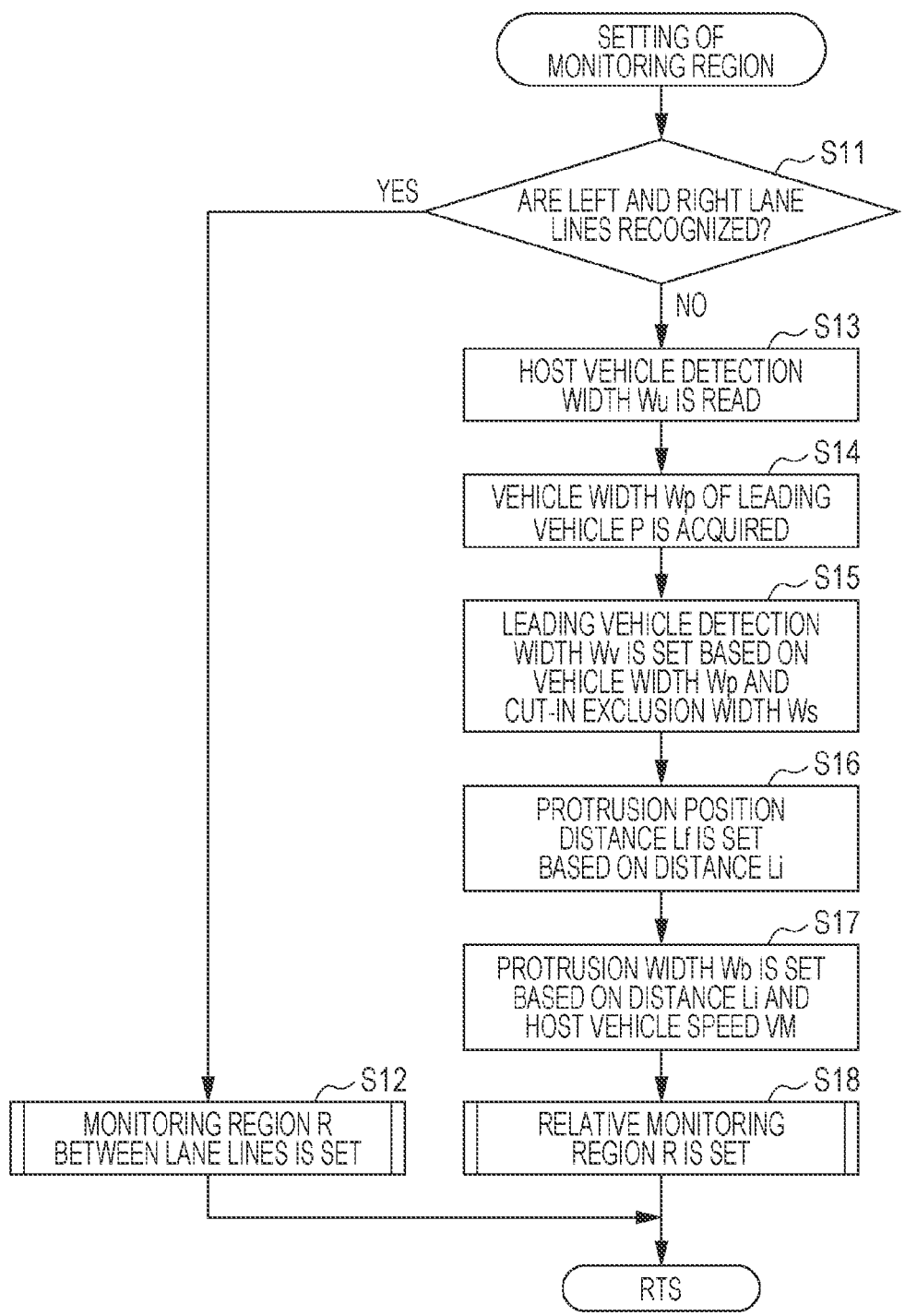
FIG. 4 is a flowchart of a subroutine for setting a monitoring region.
Figure 5:
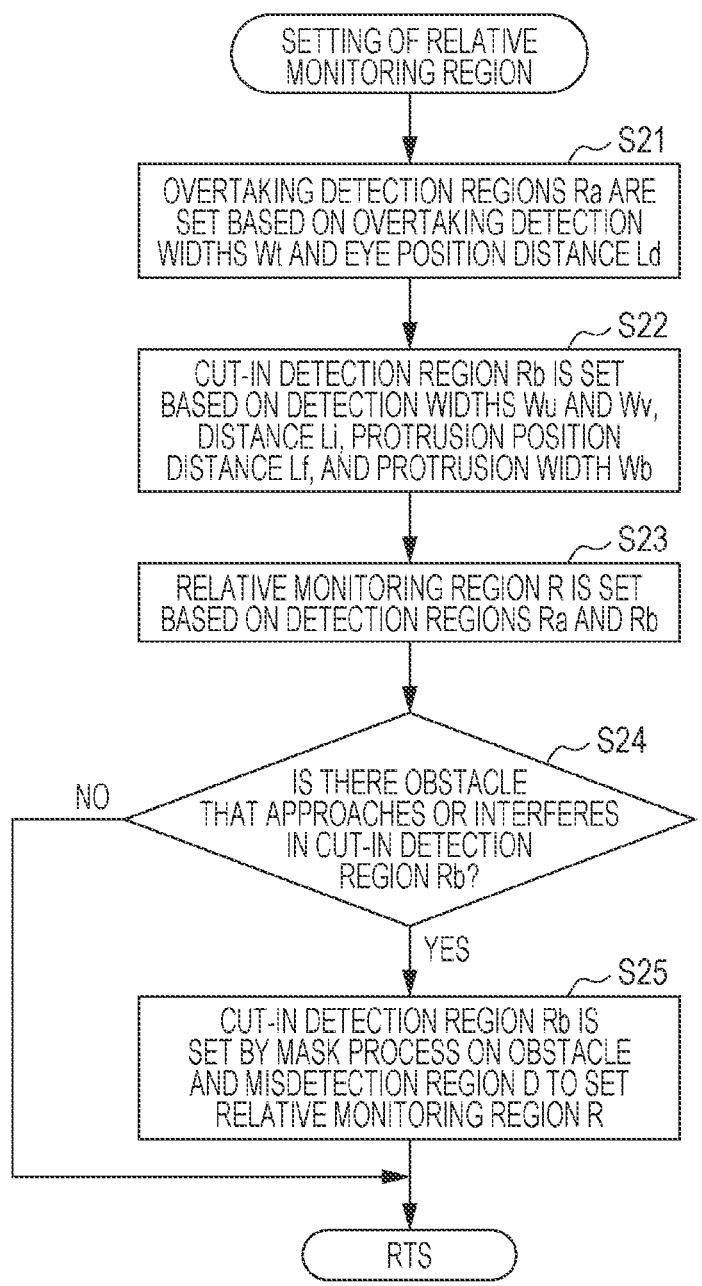
FIG. 5 is a flowchart of a subroutine for setting a relative monitoring region.

The driving assistance control unit 11 sets the monitoring region R when implementing the ACC and always monitors whether the cut-in vehicle I or the moving body O on the road edge that enters the monitoring region R is present. In accordance with flowcharts illustrated in FIG. 3 to FIG. 5, the monitoring region R is set, the cut-in vehicle I or the moving body O on the road edge that enters the monitoring region R is monitored, and the avoidance control is implemented.

Figure 3:
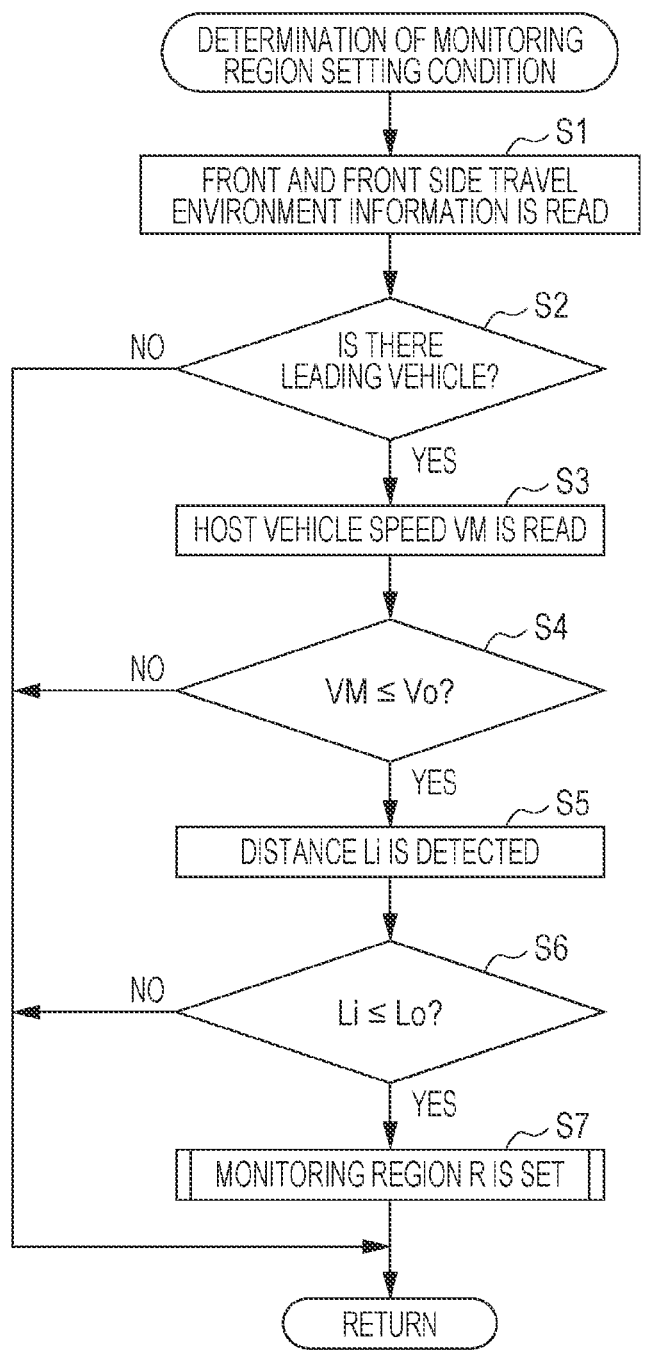
FIG. 3 is a flowchart of a routine for determining a monitoring region setting condition.

The driving assistance control unit 11 calls a routine for determining a monitoring region setting condition illustrated in FIG. 3 and investigates whether a condition in which the monitoring region R is set is satisfied. At a step S1 in the routine, the front environment information from the vehicle-mounted camera unit 21 and the front side environment information from the front-left side sensor 22 and the front-right side sensor 23 are first read.

Subsequently, the flow proceeds to a step S2, and whether the leading vehicle P to be followed is detected is investigated based on the front environment information. If the leading vehicle P to be followed is detected, the flow proceeds to a step S3. If the leading vehicle P to be followed is not detected, the routine ends, and normal ACC is implemented by using the set vehicle speed. A process at the step S2 corresponds to the process of a leading-vehicle detector according to the embodiment of the disclosure configured to detect a leading vehicle to be followed by the vehicle.

At the step S3, the vehicle speed VM that is detected by the vehicle speed sensor 24 is read, the flow proceeds to a step S4, and the vehicle speed VM and a low-speed determination threshold Vo are compared. The low-speed determination threshold Vo has a value that is used to determine whether the vehicle speed is a very low speed for so-called slow driving and whether the vehicle speed is zero and that is, for example, about 10 to 15 [Km/h]. If VM>Vo is satisfied, the routine ends, the ACC causes the vehicle M to travel so as to follow the leading vehicle P as usual. If VM≤Vo is satisfied, the flow proceeds to a step S5.

At the step S5, a distance Li from the leading vehicle P that is calculated based on the front environment information is detected by using the known principle of triangulation. A process at this step corresponds to the process of a distance detector according to the embodiment of the disclosure.

The flow proceeds to a step S6, and the distance Li and a permissible cut-in distance Lo are compared. During the following travel, the distance from the leading vehicle P is set depending on the vehicle speed VM, and a target distance between the vehicles is set such that as the vehicle speed VM decreases, the target distance decreases. During the ACC, however, the vehicle M accelerates so as to follow the leading vehicle P when a certain delay time has passed after the leading vehicle P accelerates. The same is true for the case where the vehicle M that is stopped starts so as to follow the leading vehicle P.

Accordingly, when the leading vehicle P accelerates, the distance Li temporarily exceeds the target distance between the vehicles. At this time, probability that another vehicle cuts in increases. The permissible cut-in distance Lo corresponds to the lower limit of the distance between the vehicles that the driver of the vehicle M calmly permits when another vehicle cuts in and is, for example, about 8 to 12 [m].

If Li>Lo is satisfied, it is determined that the driver is calm even if another vehicle cuts in, the routine ends, and the ACC causes the vehicle M to travel so as to follow the leading vehicle P as usual. In this case, the leading vehicle P to be followed by the vehicle M is changed to the cut-in vehicle I.

If Li Lo is satisfied, the flow proceeds to a step S7, a process of setting the monitoring region is performed, and the routine ends. The process of setting the monitoring region at the step S7 is performed in accordance with a subroutine of setting the monitoring region illustrated in FIG. 4.

At a step S11 in the subroutine, whether the lane lines that define the left and right of the lane in which the vehicle M travels are recognized is first investigated based on the front environment information or the front side environment information. If the lane lines are recognized, the flow proceeds to a step S12. If the lane lines are not recognized, the flow proceeds to a step S13.

Figure 9:
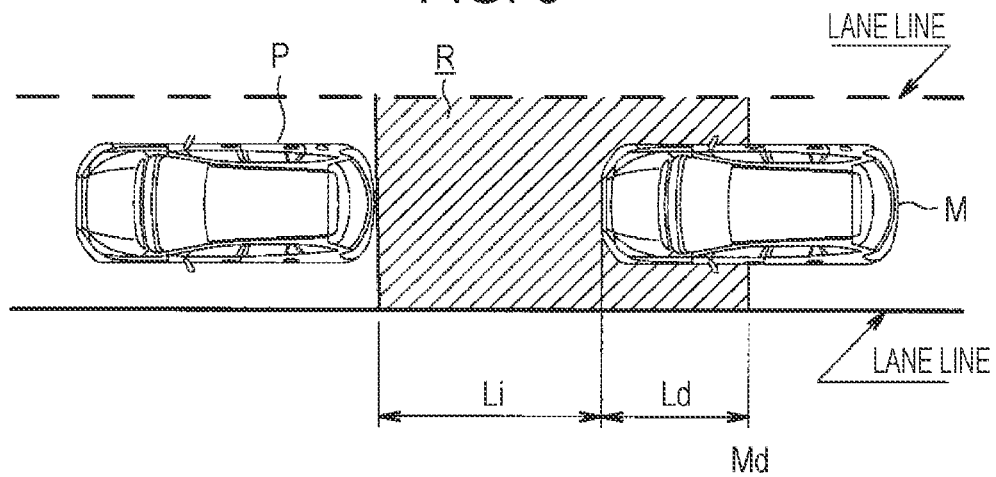
FIG. 9 illustrates the monitoring region that is set with lane lines recognized.

At the step S12, the monitoring region R is set with the lane lines recognized and is temporarily stored in, for example, the RAM, and the routine ends. The monitoring region R is set at the step S12 imaginarily with respect to the lane in which the vehicle M travels. As illustrated in FIG. 9, the width in the left-right direction is defined by the lane lines, and the length in the front-rear direction is defined by a value acquired by adding a distance Ld to a position Md of the driver' eyes (referred to below as an "eye position distance") to the distance Li between the leading vehicle P and the vehicle M. The position Md of the driver' eyes means the position of the eyes that can shift in the front-rear direction when the driver sits on the driving sheet. The position of the driver' eyes shifts in the front-rear direction depending on the position at which the driver sits. According to the present embodiment, however, the position is set to a fixed value based on the average position of the driver.

After the flow proceeds from the step S11 to the step S13, the monitoring region R that is relative is set through the steps S13 to S18, based on the relationship between the leading vehicle P and the vehicle M.

In the case where the lane lines that define the lane in which the vehicle M travels cannot be recognized from the front environment information or the front side environment information, the cut-in vehicle I can be detected early by increasing the width of the monitoring region R in the left-right direction. However, in the case where the width of the monitoring region R in the left-right direction is increased more than necessary, there is a possibility that a vehicle that travels side by side in an adjacent lane is mistakenly recognized as the cut-in vehicle I.

When the cut-in vehicle I tries to cut in a region in front of the vehicle M and the distance Li is relatively long, the cut-in vehicle I enters the region at a position relatively separated from the vehicle M at a small steering angle. In the case where the distance Li is relatively short, the cut-in vehicle I enters the region from a position near the vehicle M at a relatively large steering angle and at a decreased speed. Accordingly, the monitoring region R is set depending on the timing with which the cut-in vehicle I cuts in, and this prevents determination from being mistakenly made and makes early detection possible.

Figure 10:
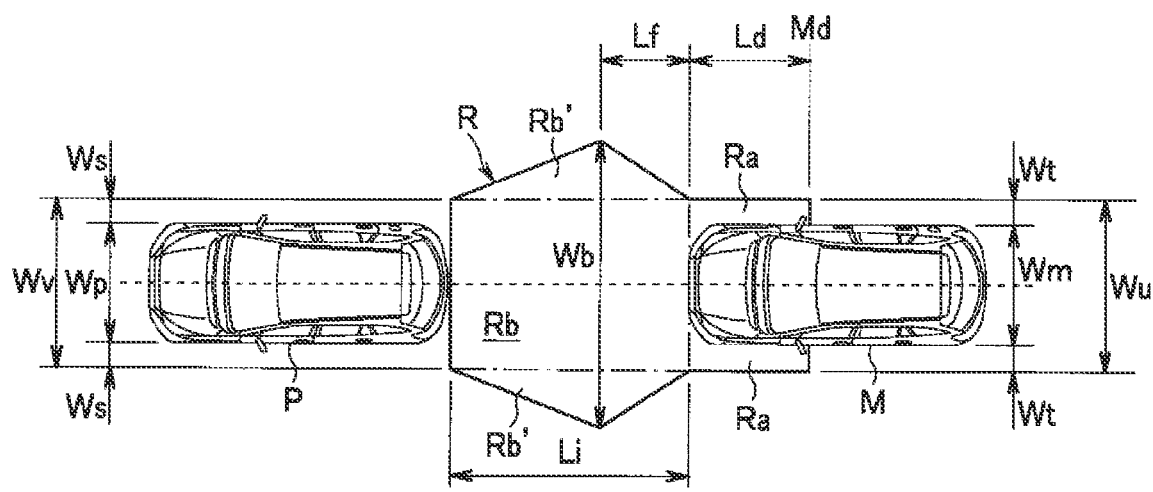
FIG. 10 illustrates the monitoring region with the lane lines unrecognized.

Accordingly, the monitoring region R that is relative is set by using the relationship between the distance Li and the vehicle speed VM through the steps S13 to S18. As illustrated in FIG. 10, the monitoring region R is set such that overtaking detection regions Ra that each have a length equal to the eye position distance Ld and a cut-in detection region Rb that has a length equal to the distance Li are combined with each other. The cut-in detection region Rb has the shape of two trapezoids that have the common lower side corresponding to a left-right maximum protrusion width Wb described later.

At the step S13, a vehicle detection width Wu is read. As illustrated in FIG. 10, the vehicle detection width Wu is acquired by adding the vehicle width Wm of the vehicle M and overtaking detection widths Wt that are set for both sides of the vehicle M together. Each overtaking detection width Wt has a fixed value that is set in advance. According to the present embodiment, the overtaking detection width Wt is set to about 0.8 to 1.2 [m], and the vehicle detection width Wu (=Wm+2Wt) has a fixed value that is stored in, for example, the ROM in advance.

Subsequently, the flow proceeds to the step S14, and the vehicle width (referred to below as the "leading vehicle width") Wp of the leading vehicle P is acquired based on the front environment information. The flow proceeds to the step S15, and a leading vehicle detection width Wv (Wv←Wp+2Ws) is set based on the leading vehicle width Wp and cut-in exclusion widths Ws that are set for both sides of the leading vehicle P. After the leading vehicle P that is stopped starts, the vehicle M starts so as to follow the leading vehicle P when the delay time has passed as described above. Accordingly, the distance Li temporarily increases. Consequently, the cut-in vehicle I tries to cut in from a position near the leading vehicle P. Each cut-in exclusion width Ws is a width that enables determination to be made such that the cut-in vehicle I does not cuts in even under such circumstances and that has a fixed value that is set in advance.

In this case, it can be considered that the leading vehicle detection width Wv is set to the leading vehicle width Wp. However, in that case, the cut-in vehicle I that suddenly cuts in cannot be detected early. When the cut-in exclusion width Ws is relatively large, there is a possibility that a vehicle that approaches the leading vehicle P and that travels side by side is mistakenly determined to be the cut-in vehicle. According to the present embodiment, the cut-in exclusion width Ws is set to about 0.8 to 1.2 [m] but is not limited thereto.

Subsequently, the flow proceeds to the step S16, and a distance (referred to below as a "protrusion position distance") Lf from the front end of the vehicle M to a left-right maximum protrusion position is set based on the distance Li by referring to a maximum protrusion position setting table. The protrusion position distance Lf is used to set a position for dealing with the cut-in vehicle I that suddenly cuts in. The left-right maximum protrusion width Wb described later is set in accordance with the protrusion position distance Lf.

Figure 7:
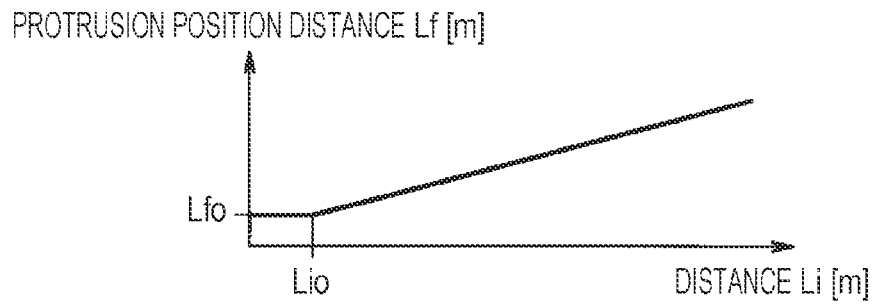
FIG. 7 schematically illustrates a maximum protrusion position setting table.

FIG. 7 schematically illustrates the maximum protrusion position setting table. The maximum protrusion position setting table contains the protrusion position distance Lf that increases in proportion to the distance Li with a predetermined slope. When the distance Li is equal to or less than a predetermined distance Lio, values are contained such that the position the protrusion position distance Lf away from the vehicle M is set to be nearer, to the leading vehicle P, than a position at least the half (Lio/2) of the distance Lio away from the vehicle M. The protrusion position distance Lf may be acquired by an arithmetic expression.

Figure 8:
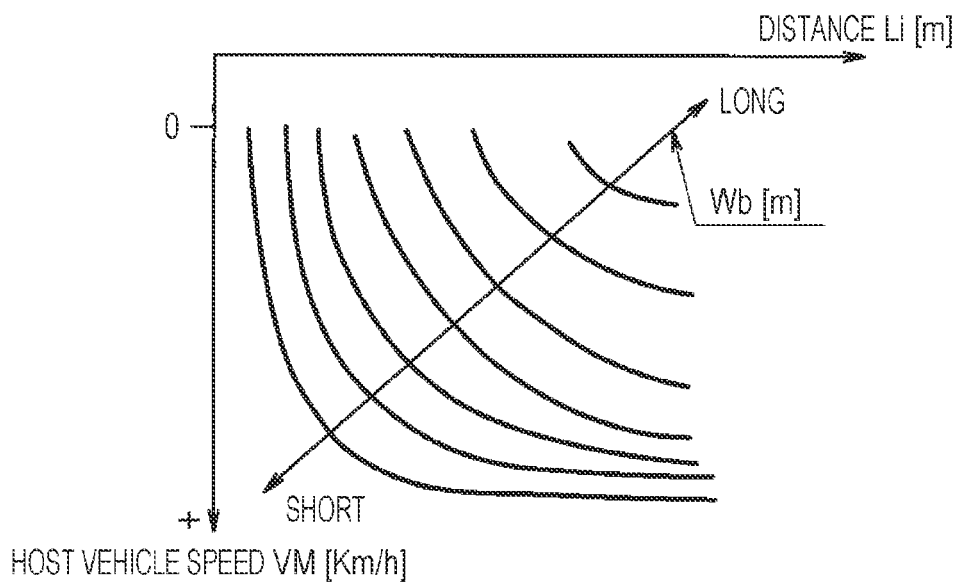
FIG. 8 schematically illustrates a left-right protrusion width setting map.

Subsequently, the flow proceeds to the step S17, and the left-right maximum protrusion width Wb is set based on the distance Li and the vehicle speed VM by referring to a left-right protrusion width setting map with interpolation calculation. FIG. 8 schematically illustrates the left-right protrusion width setting map. The left-right protrusion width setting map contains the left-right maximum protrusion width Wb that increases along with increase in the distance Li and along with decrease in the vehicle speed VM, based on the distance Li and the vehicle speed VM. That is, the longer the distance Li and the lower the vehicle speed VM, the more the cut-in vehicle I easily cuts in. Accordingly, the cut-in vehicle I that cuts in is detected early by increasing the left-right maximum protrusion width Wb.

Subsequently, the flow proceeds to the step S18, the monitoring region R that is relative is set, and the routine ends. The monitoring region R that is relative is set in accordance with the subroutine of setting the monitoring region that is relative illustrated in FIG. 5. At a step S21 in the subroutine, the overtaking detection regions Ra are set based on the overtaking detection widths Wt and the eye position distance Ld for both sides of the vehicle M (see FIG. 10 to FIG. 18). A process at this step corresponds to the process of an overtaking-detection-region setter.

Subsequently, the flow proceeds to a step S22, and the cut-in detection region Rb is set based on the vehicle detection width Wu, the leading vehicle detection width Wv, the distance Li, the protrusion position distance Lf, and the left-right maximum protrusion width Wb. A process at the step S22 corresponds to the process of a region setter according to the embodiment of the disclosure configured to set a cut-in detection region.

That is, as illustrated in FIG. 10, the left-right maximum protrusion width Wb the center of which coincides with the center of the vehicle M in the vehicle width direction is set at the position of the protrusion position distance Lf. An isosceles trapezoid is defined by connecting ends of the left-right maximum protrusion width Wb with respective ends of the vehicle detection width Wu. In addition, the ends of the left-right maximum protrusion width Wb are connected with respective ends of the leading vehicle detection width Wv to set the cut-in detection region Rb that has the shape of the two trapezoids that have the common lower side corresponding to the left-right maximum protrusion width Wb and that have upper sides corresponding to the detection widths Wu and Wv. Consequently, triangular protruding regions Rb' are set as left and right parts of the cut-in detection region Rb by using lines connecting the ends of the vehicle detection width Wu with the respective ends of the leading vehicle detection width Wv.

Figure 13:
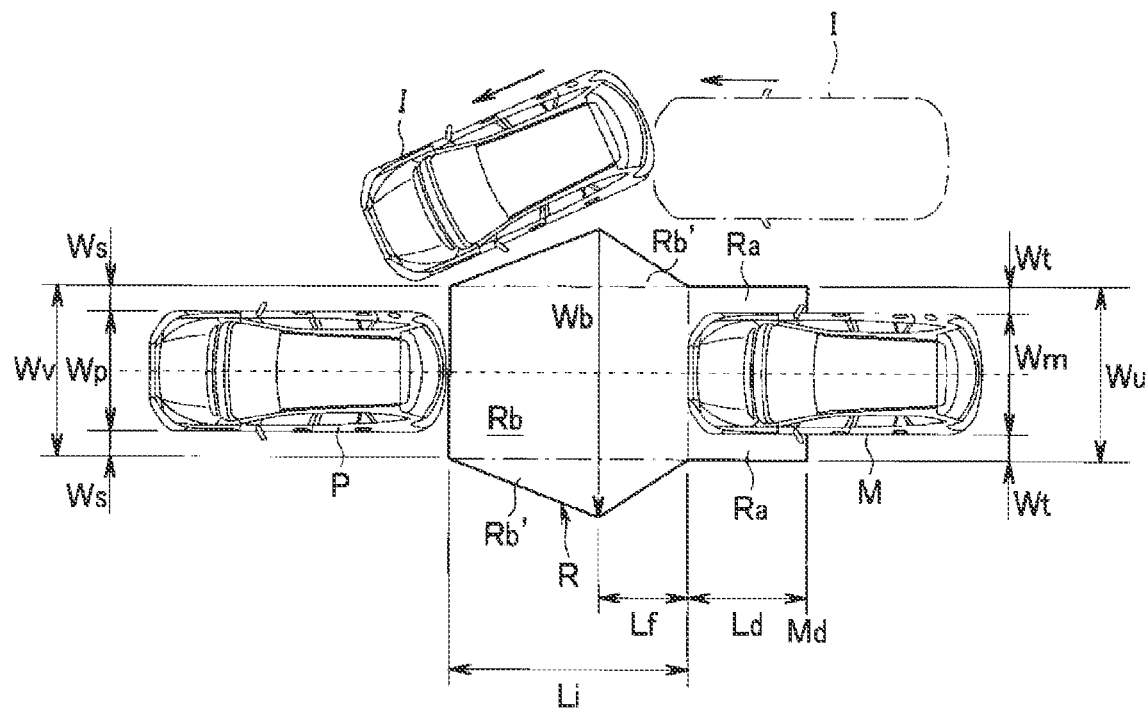
FIG. 13 illustrates a cut-in vehicle that tries to cut in the monitoring region near a leading vehicle.
Figure 14:
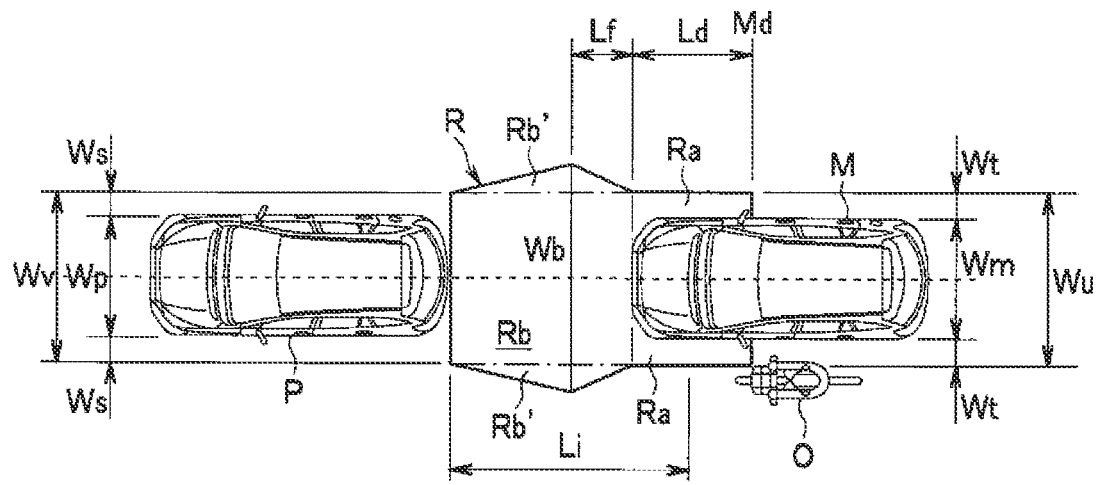
FIG. 14 illustrates a motorcycle in the monitoring region that tries for overtaking.
Figure 15:
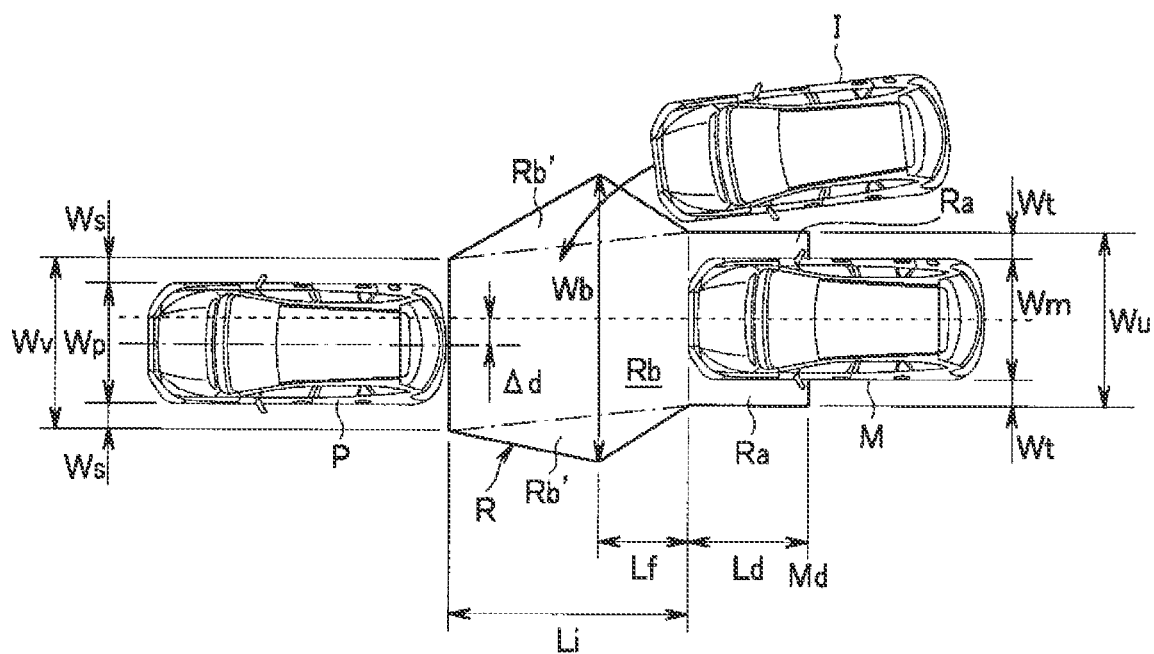
FIG. 15 illustrates the monitoring region that is set with the leading vehicle shifting in a vehicle width direction.
Figure 16:
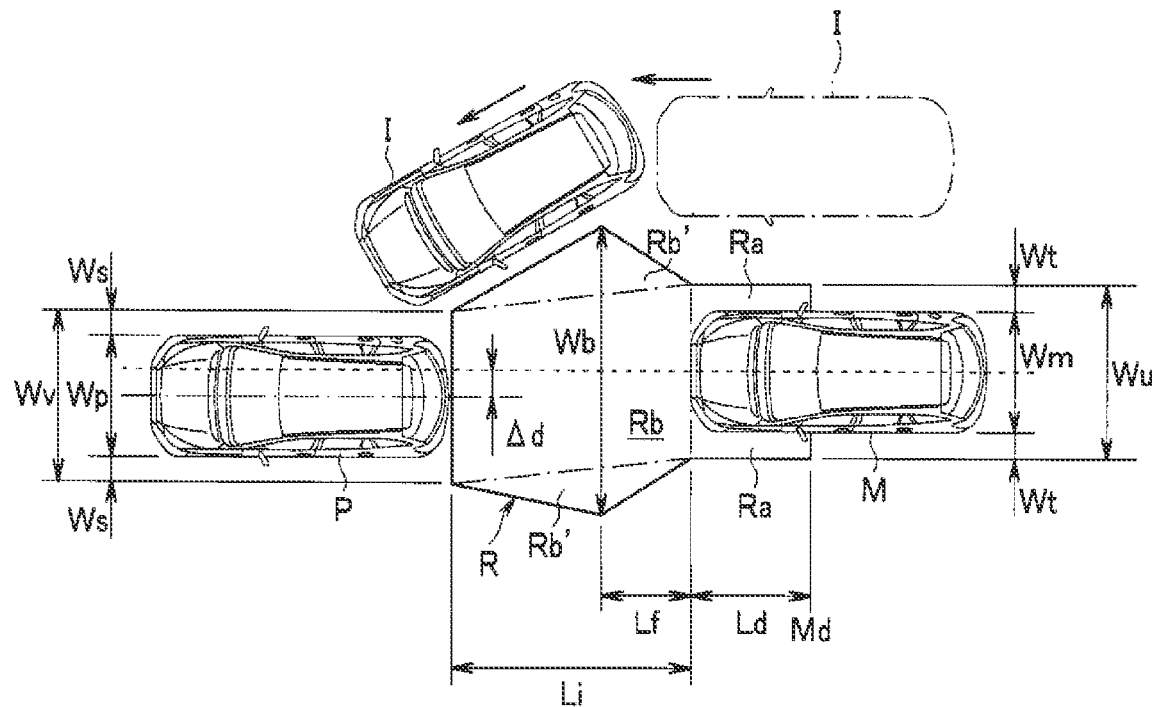
FIG. 16 illustrates a cut-in vehicle that tries to cut in the monitoring region in FIG. 15.

As for the cut-in detection region Rb, when the center of the vehicle M and the center of the leading vehicle P in the vehicle width direction coincide with each other as illustrated in FIG. 10 to FIG. 14, a part of the cut-in detection region Rb near the leading vehicle P is the isosceles trapezoid. When the center of the vehicle M shifts from the center of the leading vehicle P in the vehicle width direction by $\Delta d$ as illustrated in FIG. 15 and FIG. 16, the leading vehicle detection width Wv shifts along with this, and the part of the cut-in detection region Rb near the leading vehicle P is a non-isosceles trapezoid. In this case, as illustrated in FIG. 15, a part near the vehicle maintains an isosceles trapezoid shape even when the shift width $\Delta d$ in the width direction of the vehicle M and the leading vehicle P is produced, and appropriate handling can be done even if the cut-in vehicle I suddenly cuts in from the adjacent left or right lane.

In the case where the lane lines that define the left and right of the lane in which the vehicle M travels cannot be recognized, the ACC detects the center of the leading vehicle width Wp and controls the lateral position such that the center coincides with the center of a vehicle width Wm during the following travel. At this time, for example, when the leading vehicle P shifts in a vehicle width direction by a handle operation to avoid an obstacle as illustrated in FIG. 18, the center of the leading vehicle width Wp temporarily shifts from the center of the vehicle width Wm by $\Delta d$.

Subsequently, the flow proceeds to a step S23, and the monitoring region R is set by using the detection regions Ra and Rb. A process at the step S23 corresponds to the process of a monitoring-region setter.

Subsequently, the flow proceeds to a step S24, and whether there is an obstacle that approaches or interferes in the cut-in detection region Rb is investigated. The obstacle is detected based on the front environment information from the vehicle-mounted camera unit 21 and the front side environment information from the front-left side sensor 22 and the front-right side sensor 23 that are acquired in a chronological order. However, the shape or the kind may not be recognized.

Figure 17:
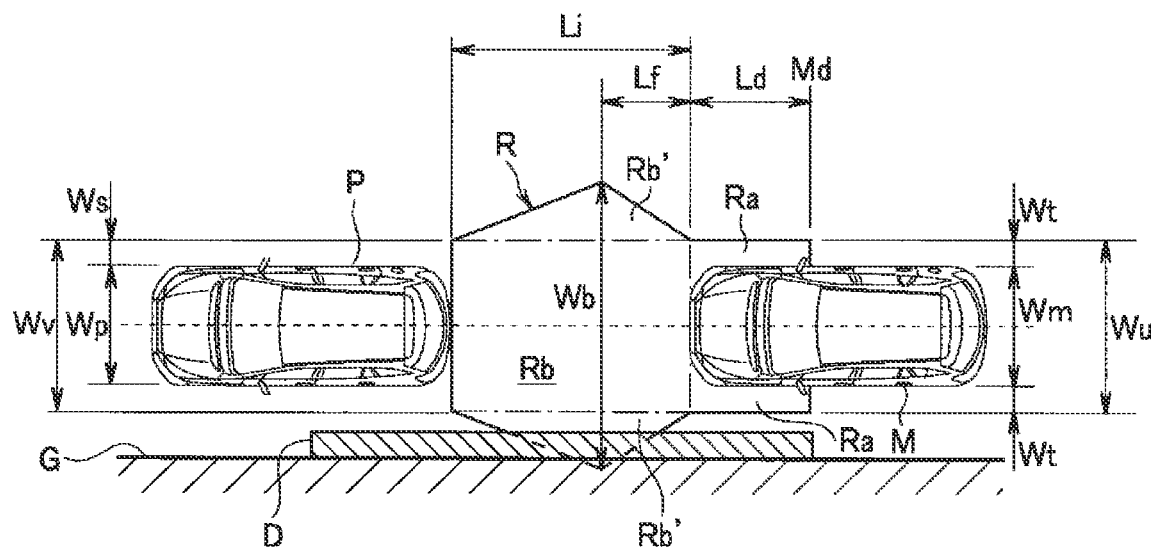
FIG. 17 illustrates the monitoring region that is set when a stationary object is located sideways in one direction.
Figure 18:
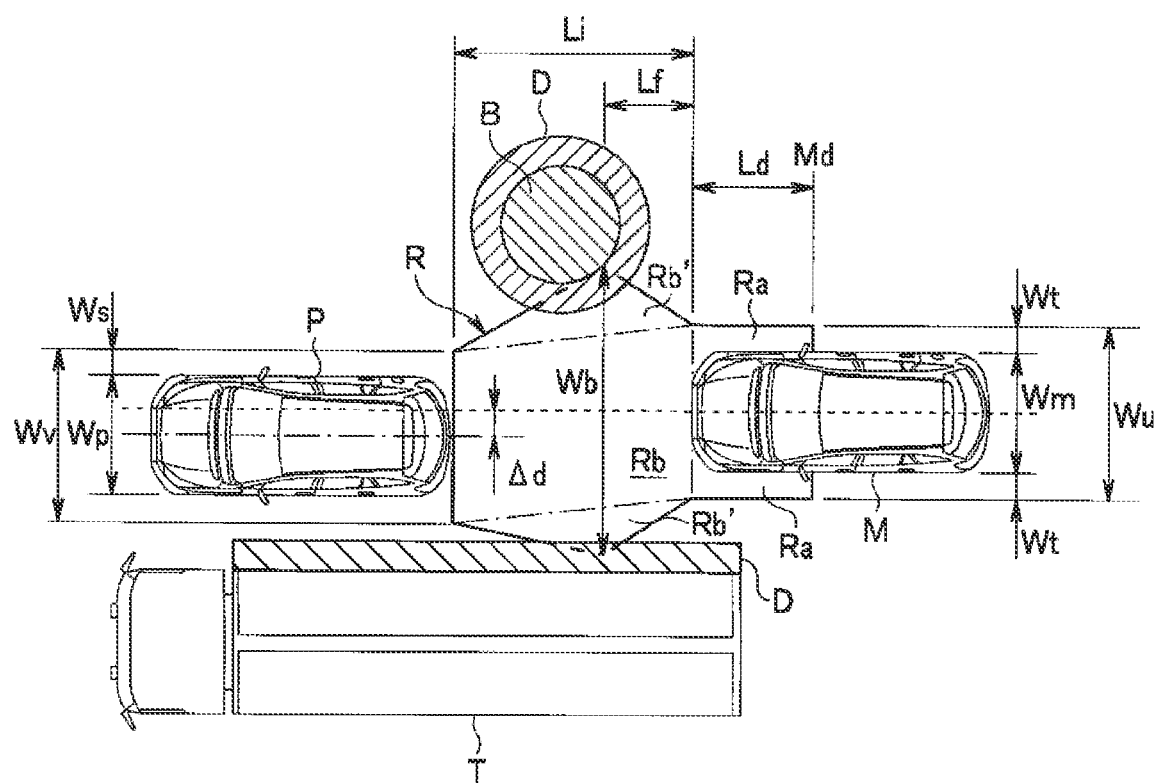
FIG. 18 illustrates the monitoring region that is set when a moving body is located sideways in one direction, and a stationary object is located sideways in the opposite direction.

For example, as illustrated in FIG. 17 and FIG. 18, an object that approaches or interferes in the cut-in detection region Rb is detected based on the environment information that is acquired in a chronological order. In the case where it is determined that the object is not moving, the object is determined to be an obstacle (a wall object G such as a guardrail in FIG. 17 or a columnar object B such as a tree or a utility pole in FIG. 18). As illustrated in FIG. 18, the object that approaches or interferes in the cut-in detection region Rb is detected based on the environment information that is acquired in a chronological order. The object is determined to be an obstacle (a truck T) also in the case where it is determined that the object travels side by side. Accordingly, as illustrated in FIG. 14, an object that interferes in one of the overtaking detection regions Ra is not determined to be an obstacle but is determined to be the moving body O on the road edge, based on the environment information that is acquired in a chronological order even when the object travels side by side with the vehicle M.

If an obstacle that approaches or interferes in the cut-in detection region Rb is not detected, the monitoring region R that is set at the step S23 and that is relative is temporarily stored in, for example, the RAM, and the routine ends. The monitoring region R that is relative is imaginarily defined on the road on which the vehicle M travels.

If the obstacle that approaches or interferes in the cut-in detection region Rb is detected, the flow proceeds to a step S25. At the step S25, a misdetection region D is set along an outer periphery for the obstacle (the wall object G in FIG. 17 or the columnar object B in FIG. 18), and a mask process is performed on a part of the cut-in detection region Rb in which the obstacle (G or B) interferes in the misdetection region D. The misdetection region D is set to prevent determination from being mistakenly made such that the vehicle that approaches the vehicle M and that travels side by side is the cut-in vehicle I. According to the present embodiment, the misdetection region D is set to about 0.3 to 0.8 [m], which is a width that prevents the moving body O on the road edge from overtaking but is not limited thereto.

The monitoring region R that is relative is reset by using the overtaking detection regions Ra and the cut-in detection region Rb after the mask process and is temporarily stored in, for example, the RAM, and the routine ends.

Figure 6:
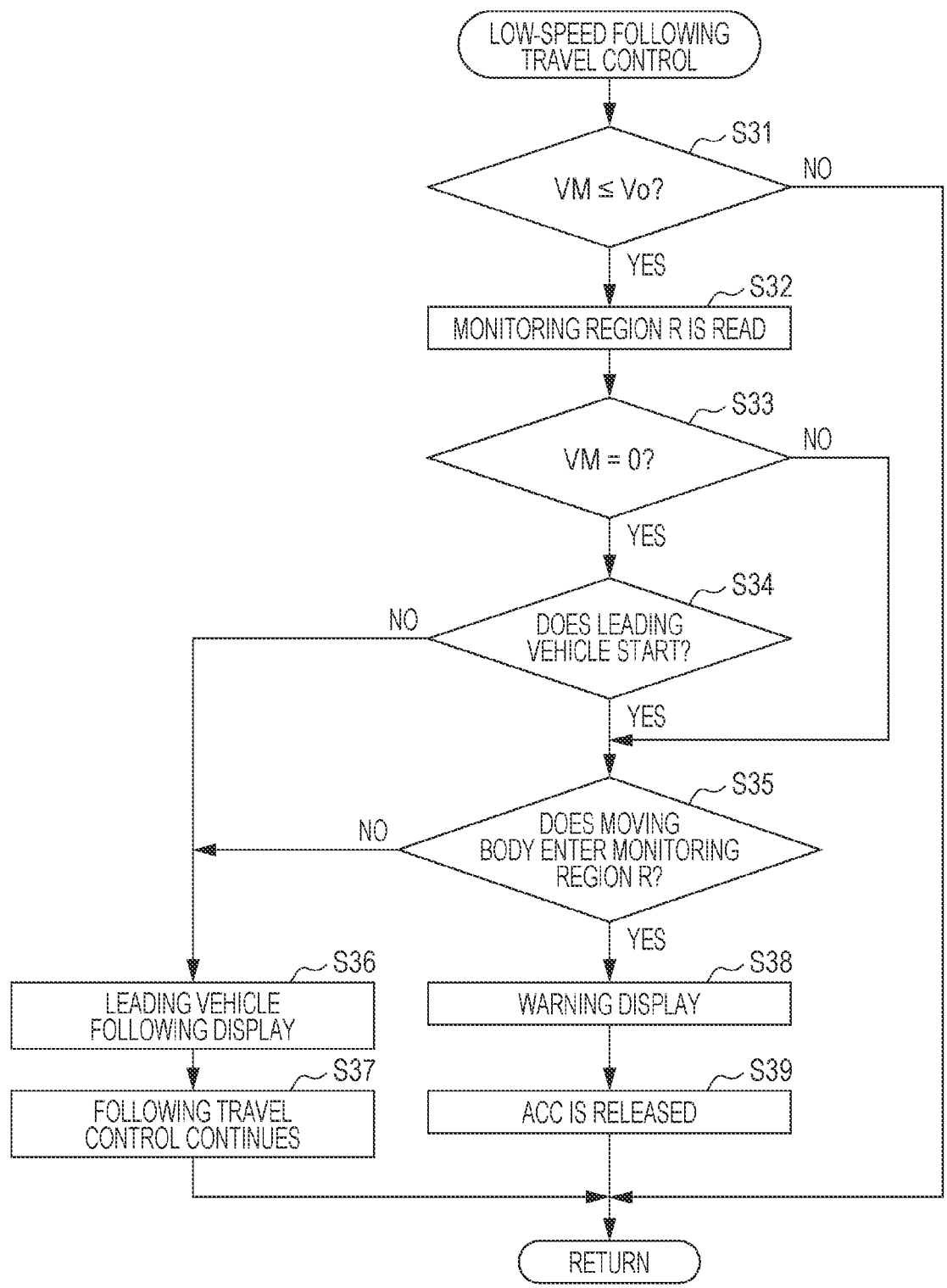
FIG. 6 is a flowchart of a routine of low-speed following travel control.

The monitoring region R that is relative is read in a routine of low-speed following travel control illustrated in FIG. 6. Processing that is performed in FIG. 6 corresponds to the process of a travel controller according to the embodiment of the disclosure configured to cause the vehicle to travel such that the vehicle follows the leading vehicle.

The routine is called when the vehicle M travels so as to follow the leading vehicle P in the normal ACC. That is, at a step S31, the vehicle speed VM and the low-speed determination threshold Vo are first compared. If VM>Vo is satisfied, the routine ends, and the ACC causes the vehicle M to travel so as to follow the leading vehicle P as usual. If VM≤Vo is satisfied, the flow proceeds to a step S32.

At the step S32, the monitoring region R is read. Subsequently, the flow proceeds to a step S33, and whether the vehicle M is stopped so as to follow the leading vehicle P (following stop) is investigated. If the result is the following stop (VM=0), the flow proceeds to a step S34. If the vehicle M travels (VM>0), the flows jumps to a step S35.

At the step S34 after the determination of the following stop, whether the leading vehicle P starts is investigated based on the front environment information. If the start of the leading vehicle P is detected, the flow proceeds to the step S35. If the leading vehicle P remains stopped, the flow proceeds to a step S36. If the start of the leading vehicle P is detected, the ACC causes the vehicle M to start so as to follow the leading vehicle P when a predetermined delay time has passed.

At the step S35 after the step S33 or the step S34, whether a moving body enters the monitoring region R is investigated. Examples of the moving body include the cut-in vehicle I illustrated in FIG. 11 and the moving body O on the road edge illustrated in FIG. 14. A process at this step corresponds to the process of a moving-body detector according to the embodiment of the disclosure.

Figure 11:
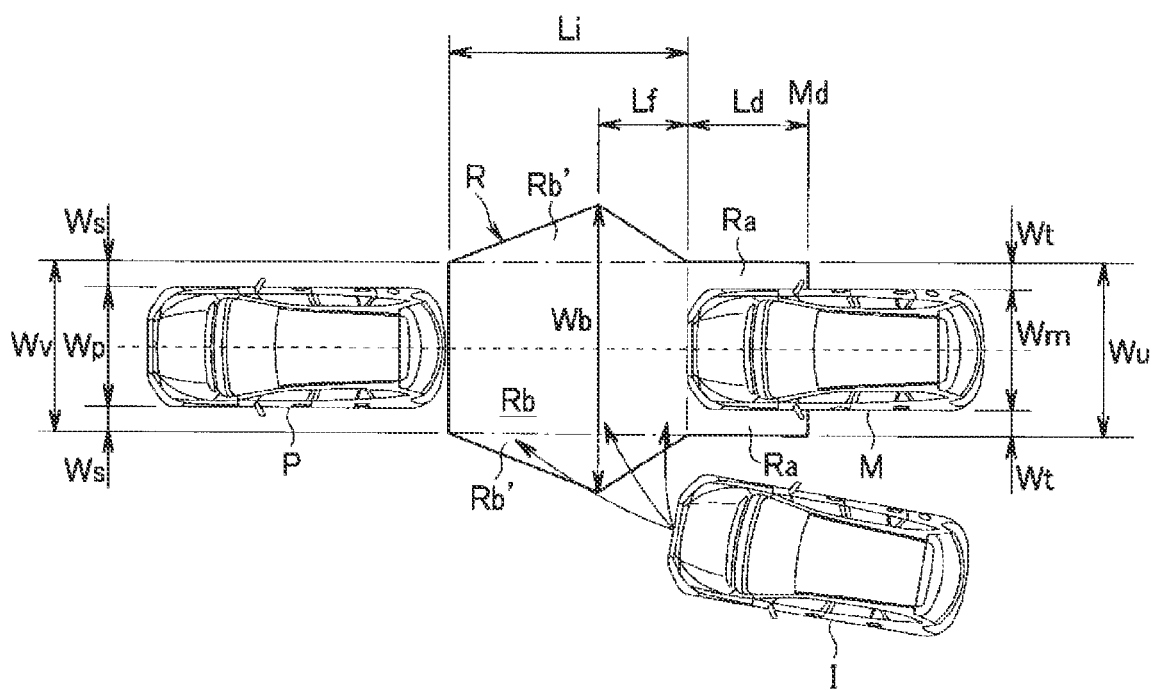
FIG. 11 illustrates a cut-in vehicle that cuts in the monitoring region from the left-hand side.

For example, as illustrated in FIG. 11, in the case where the distance Li enables a space that the cut-in vehicle I can cut in to be ensured, the cut-in vehicle I tries to cut in the cut-in detection region Rb from a position near the vehicle M at a low speed and at a relatively large steering angle. However, in the case where the cut-in vehicle I tries to cut in one of the protruding regions Rb' near a part that has the maximum width (the left-right maximum protrusion width Wb), the cut-in vehicle I enters the protruding region Rb' at a small steering angle and at a speed higher than the vehicle speed VM. In the case where the cut-in vehicle I tries to cut in the region near the leading vehicle P, the cut-in vehicle I decelerates before entering or waits until the leading vehicle P starts to ensure the sufficient distance between the vehicles and then enters the cut-in detection region Rb. If entrance of a moving body is not detected, the flow proceeds to the step S36. If the entrance of the moving body is detected, the flow proceeds to a step S38.

At the step S36 after the step S34 or the step S35, the driving assistance control unit 11 causes a multi-information display that is disposed on an instrument panel, for example, to display an image that represents that the leading vehicle is captured before the following travel, the flow proceeds to a step S37, the following travel control causes the vehicle M to continue following the leading vehicle P, and the routine ends.

At the step S38 after the step S35, a notification that represents that the ACC is to be released is given from the notification device 25 by using a voice, characters, or an image, the flow proceeds to a step S39, the ACC is released when a predetermined time has passed, and the routine ends. During the ACC, the driver does not press an accelerator pedal. Accordingly, when the ACC is released and the accelerator pedal is not pressed, driving force is reversely applied from driving wheels to the driving source, and consequently, the speed decreases.

In the case where the cut-in vehicle I tries to cut in between the leading vehicle P and the vehicle M as described above, the vehicle speed and the steering angle when the cut-in vehicle I enters the region change depending on the distance Li and the position at which the cut-in vehicle I tries to cut in. In this case, according to the present embodiment, the driving assistance control unit 11 can detect the cut-in vehicle I that enters the region with high precision regardless of the position of cutting in in a manner in which the triangular protruding regions Rb' are set on the left and right of the cut-in detection region Rb.

Consequently, the driving assistance control unit 11 can achieve appropriate handling against the cut-in vehicle I in good time. In addition, since the protruding regions Rb' are triangular, misdetection can be prevented from occurring.

Figure 12:
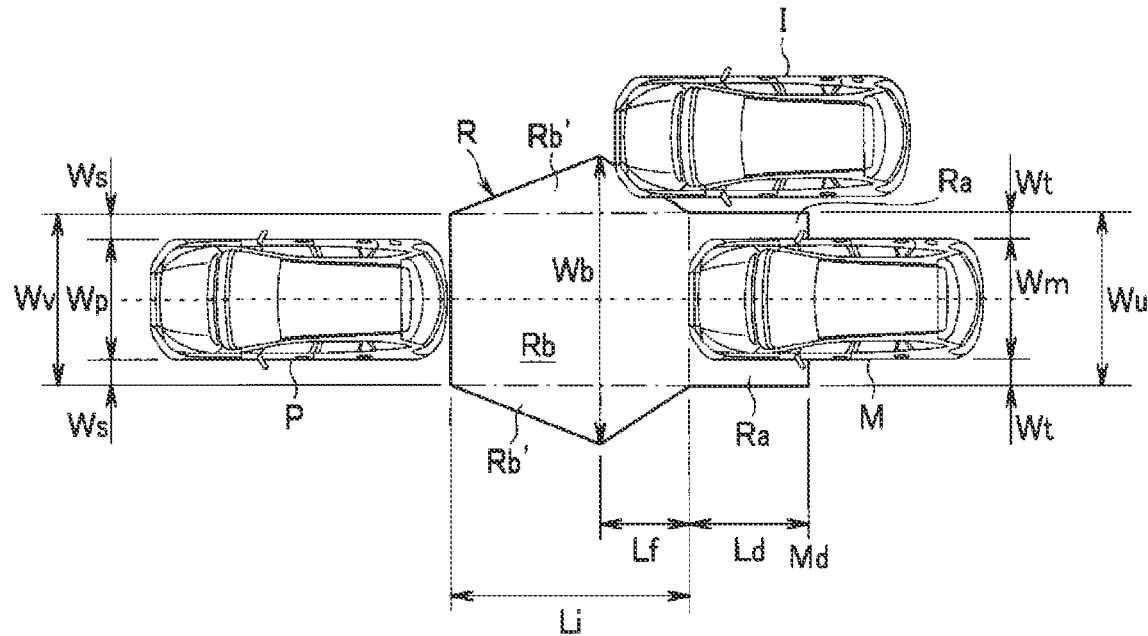
FIG. 12 illustrates a cut-in vehicle that cuts in the monitoring region from the right-hand side.

The situation illustrated in FIG. 12 most frequently arises in the case where the cut-in vehicle I tries to cut in the cut-in detection region Rb. That is, the cut-in vehicle I that travels in an adjacent lane moves slowly from the rear to the front of the vehicle M that travels at a low speed or is stopped so as to follow the leading vehicle P. In the meanwhile, whether the distance Li enables a space for cutting in to be ensured is checked. If it is determined that the space for cutting in can be ensured, the cut-in vehicle I cuts in by handling.

At this time, according to the present embodiment, the protruding regions Rb' are set on the left and right of the cut-in detection region Rb. This enables the entrance of the front end of the cut-in vehicle I to be detected and consequently enables the cut-in vehicle I that cuts in to be detected as soon as possible.

As illustrated in FIG. 13, the cut-in vehicle I ties to cut in from a position near the leading vehicle P but cannot cut in, and the front end of the cut-in vehicle I does not enter the cut-in detection region Rb. Accordingly, the driving assistance control unit 11 may not take a measure against the cut-in vehicle I and can allow the vehicle M to continue travelling at a low speed so as to follow the leading vehicle P. When the cut-in vehicle I stops in the situation illustrated in FIG. 13 and the leading vehicle P travels in the meanwhile, one of the protruding regions Rb' moves toward the cut-in vehicle I. Accordingly, the driving assistance control unit 11 detects the entrance of the cut-in vehicle I. In this case, since the leading vehicle detection width Wv of the cut-in detection region Rb is set depending on the leading vehicle P, the cut-in vehicle I does not enter the protruding region Rb' even when the shift width Δd in the width direction of the vehicle M and the leading vehicle P is produced as illustrated in FIG. 16, and misdetection can be prevented from occurring.

The embodiment of the disclosure is not limited to the above description. For example, the cut-in vehicle I may be a motorcycle.

As for the vehicle driving assistance apparatus according to the present embodiment, the region setter may set the left-right maximum protrusion position to a position nearer than the middle of the distance between the vehicles to the leading vehicle in the case where the value of the distance that is detected by the distance detector is smaller than a predetermined value.

In addition, the region setter may set the detection width of the leading vehicle, based on the leading vehicle even in the case where the center of the leading vehicle in the vehicle width direction shifts from the center of the vehicle in the vehicle width direction.

As for the apparatus, the region setter may also set a misdetection region along the outer periphery of an obstacle in the case where the obstacle that interferes in the cut-in the detection region is detected based on the environment information that is acquired by the surrounding environment information acquirer, and a mask process may be performed on the cut-in detection region in which the obstacle and the misdetection region interfere.

The vehicle driving assistance apparatus may further include the monitoring-region setter and the overtaking-detection-region setter that sets overtaking detection regions that each have a predetermined width on both sides of the vehicle between the position of the eyes of the driver who sits on the driving sheet and the front end of the vehicle. The monitoring-region setter sets the monitoring region for monitoring the cut-in moving body and the overtaking moving body by using the cut-in detection region that is set by the region setter and the overtaking detection regions that are set by the overtaking-detection-region setter.

According to the embodiment of the disclosure, the protruding region that is included in the cut-in detection region for detecting the cut-in vehicle is set at least depending on the vehicle speed that is detected by the vehicle-speed detector such that as the vehicle speed decreases, the length of protrusion in the left-right direction increases. Accordingly, the cut-in vehicle can be detected early not only in the case where the start of the leading vehicle is detected and the vehicle tries to start so as to follow the leading vehicle, but also during the following travel at a very low speed or during the following travel with the lane lines that define the left and right of the current lane being unclear. Consequently, the avoidance control can be successfully implemented.

The driving assistance apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assistance apparatus 1 including the driving assistance control unit 11, the power control unit 12, the power steering control unit 13, the brake control unit 14, and the in-vehicle communication line 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle driving assistance apparatus to be applied to a vehicle, the vehicle driving assistance apparatus comprising:
   one or more sensors configured to:
      acquire environment information about a surrounding of the vehicle; and
      detect a vehicle speed of the vehicle; and
   at least one machine readable medium storing instructions and at least one processor configured to execute the instructions to:
      detect a leading vehicle to be followed by the vehicle, on a basis of the environment information;
      detect a moving body in the surrounding of the vehicle, on a basis of the environment information; and
      when detecting the leading vehicle to be followed by the vehicle, cause the vehicle to perform following travel in which the vehicle follows the leading vehicle;
   wherein the at least one processor is configured to execute the instructions to set a cut-in detection region detecting entrance of the moving body between the vehicle and the leading vehicle when the vehicle is caused to perform the following travel; and
   wherein the at least one processor is configured to execute the instructions to set a protruding region in the cut-in detection region in accordance with at least the vehicle speed detected by the vehicle speed detector in such a manner that a length of protrusion in a left right direction of the protruding region increases as the vehicle speed decreases.

2. The vehicle driving assistance apparatus according to claim 1,
   wherein the at least one processor is further configured to execute the instructions to set a left-right maximum protrusion position of the protruding region to a position in front of the vehicle.

3. The vehicle driving assistance apparatus according to claim 2, wherein:
   the one or more sensors are further configured to detect a distance between the vehicle and the leading vehicle, and the at least one processor is further configured to execute the instructions to set, in accordance with the distance detected, the left-right maximum protrusion position of the protruding region to the position in front of the vehicle in such a manner that a distance between the left-right maximum protrusion position and the vehicle increases as the distance between the vehicle and the leading vehicle increases.

4. The vehicle driving assistance apparatus according to claim 3,
wherein the at least one processor is further configured to execute the instructions to set a left-right maximum protrusion width at the left-right maximum protrusion position, at least on a basis of the vehicle speed.

5. The vehicle driving assistance apparatus according to claim 4,
wherein the at least one processor is further configured to execute the instructions to set a first predetermined detection width in a vehicle width direction of the vehicle and a second predetermined detection width in a vehicle width direction of the leading vehicle, and is configured to set each of two protruding sections of the protruding region to be triangular by connecting an end of the first predetermined detection width, an end of the second predetermined detection width and an end of the left-right maximum protrusion width.

6. The vehicle driving assistance apparatus according to claim 1, wherein the at least one processor is configured to execute the instructions to expand the protruding region in the width direction of the vehicle when detecting a decrease in the vehicle speed.

7. The vehicle driving assistance apparatus according to claim 1, wherein the at least one processor is configured to execute the instructions to expand the protruding region in the width direction of the vehicle when detecting an increase in distance between the vehicle and the leading vehicle.

8. The vehicle driving assistance apparatus according to claim 1, wherein
width of the cut-in detection region in the width direction of the vehicle is defined using lane lines,
length of the cut-in detection region in the traveling direction of the vehicle is defined using distance between the vehicle and the leading vehicle, and the protruding region is between the vehicle and the leading vehicle.

9. The vehicle driving assistance apparatus according to claim 8, wherein
width of the protruding region in the width direction of the vehicle is larger than width of the cut-in detection region in the width direction of the vehicle.

10. The vehicle driving assistance apparatus according to claim 9, wherein
when a center of the vehicle shifts from a center of the leading vehicle in the width direction of the vehicle, the at least one processor is configured to execute the instructions to shift the protruding region in the width direction of the vehicle.

11. A vehicle driving assistance apparatus to be applied to a vehicle, the vehicle driving assistance apparatus comprising:
one or more sensors configured to
acquire environment information about a surrounding of the vehicle, and
detect a vehicle speed of the vehicle, and
circuitry configured to
detect a leading vehicle to be followed by the vehicle, on a basis of the environment information,
detect a moving body near the vehicle, on a basis of the environment information,
in a case where the leading vehicle to be followed by the vehicle is detected, cause the vehicle to perform following travel in which the vehicle follows the leading vehicle,
set a cut-in detection region for detecting entrance of the moving body between the vehicle and the leading vehicle when the vehicle is caused to perform the following travel, and
set a protruding region in the cut-in detection region at least in accordance with the vehicle speed in such a manner that a length of protrusion in a left right direction of the protruding region increases as the vehicle speed decreases.

* * * * *